Feb. 16, 1960    C W. MUSSER ET AL    2,925,011
PRESSURE RESPONSIVE THRUSTER LOCKING MEANS
Filed Dec. 7, 1956    2 Sheets-Sheet 1
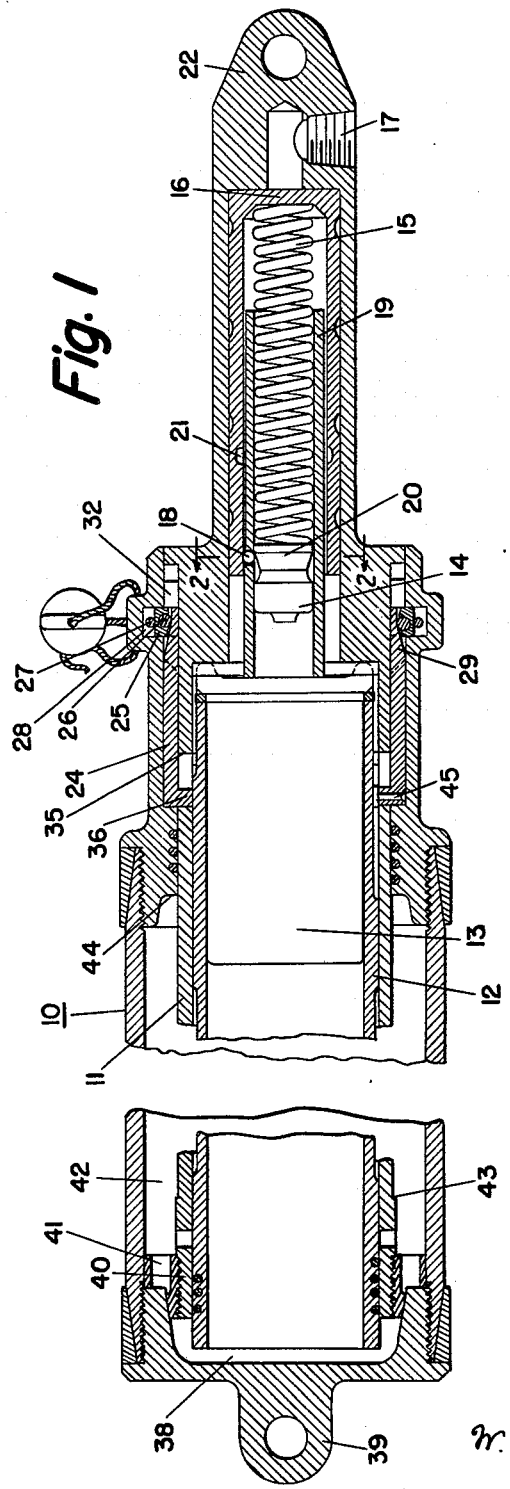
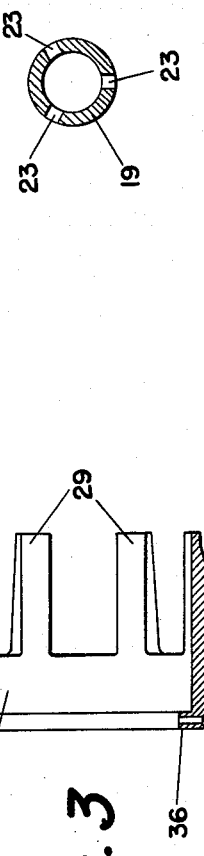
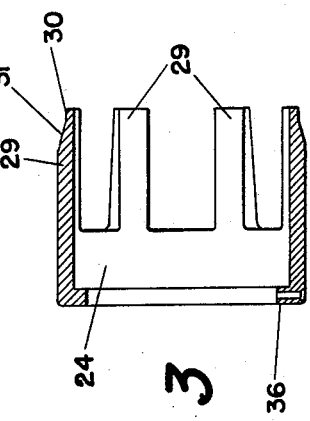
INVENTORS
C WALTON MUSSER
ROBERT W. MARKGRAF
BY
ATTORNEYS Feb. 16, 1960 C W. MUSSER ET AL 2,925,011
PRESSURE RESPONSIVE THRUSTER LOCKING MEANS
Filed Dec. 7, 1956 2 Sheets-Sheet 2
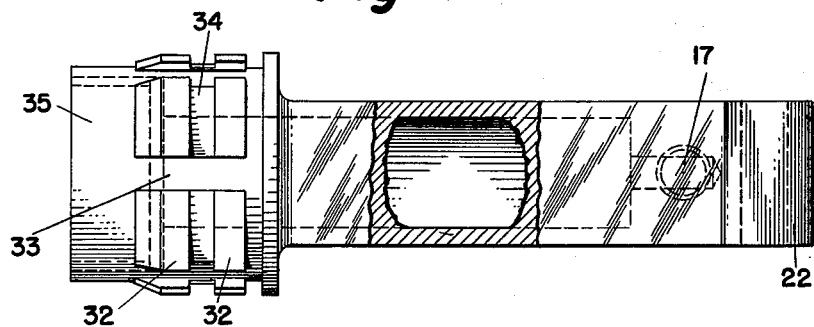
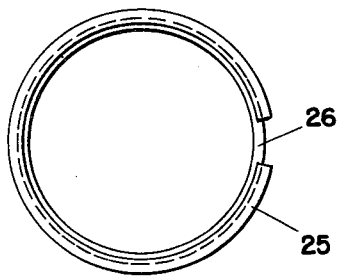
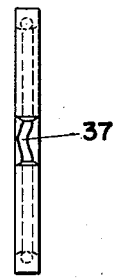
INVENTORS
C WALTON MUSSER
ROBERT W. MARKGRAF
BY
W. E. Thibodeau, A. W. Dew & H. I. Forman
ATTORNEYS

2,925,011

PRESSURE RESPONSIVE THRUSTER LOCKING MEANS

C Walton Musser, Beverly, Mass., and Robert W. Markgraf, Roslyn, Pa., assignors to the United States of America as represented by the Secretary of the Army Application December 7, 1956, Serial No. 627,542

1 Claim. (Cl. 89—1)

(Granted under Title 35, U.S. Code (1952), sec. 266)

The invention described herein may be manufactured and used by or for the Government for governmental purposes without payment of any royalty thereon.

This invention relates to cartridge actuated thrusters for high speed airplanes and has for an object to provide improved locking means therefor responsive only after the application of fluid pressure for unlocking the same. Another object is to provide a more nearly foolproof device of this sort which is safe against accidental fracture of a sear or shear pin of the sort met with in the prior art.

Heretofore, the need for locking thrusters in catapults and other devices actuated by cartridge pressure to guard against being prematurely fired has long been appreciated. But the locks have not been entirely satisfactory and foolproof. For example, shear pins, sears, and the like have been used but are at least open to the danger of becoming accidentally ruptured and inoperative for their intended purpose.

According to this invention, a positive locking device is provided for an extensible plunger or the like. Such a lock is responsive to the application of fluid pressure to the part or parts to be unlocked. Before being unlocked, neither the firing pin nor its spring are placed under substantial stress.

Fig. 1 is a longitudinal section through a preferred embodiment of this invention in which telescopic tubes are used but it will be understood that the present invention is not limited to such use of telescopic tubes and covers a construction in which only one extensible tube or plunger or piston rod is used.

Fig. 2 is a section on the line 2—2 of Fig. 1 with the carrier sleeve 19 removed.

Fig. 3 is a longitudinal section through the expander 24 of Fig. 1.

Fig. 4 is an outside view of the head of the device shown in Fig. 1.

Fig. 5 is a side view of the locking split rings shown in Fig. 1.

Fig. 6 is a right side view of the device shown in Fig. 5.

Referring to Fig. 1 of the drawing an outer cylinder or tube 10 is shown as spaced from an intermediate tube 11 which is contiguous around the innermost tube 12. A cartridge 13 is to be actuated by the firing pin 14 under the influence of the spring 15. Fluid under pressure for actuating the firing pin enters the head in the passageway 17 where it will contact the plunger 16 causing the plunger to move to the left in Fig. 1 compressing the spring 15. A locking element or ball 18 precludes the firing pin being moved until a predetermined fluid pressure has been applied to the plunger 16. This locking element 18 is shown as being carried or held in the carrier or sleeve 19 which is of tubular form surrounding the firing pin spring 15. This locking element 18 is held within the recess 20 in the firing pin but this recess is so shaped that when spring pressure is applied to the firing pin, the locking element 18 will be moved radially outward as soon as the plunger 16 permits it. As shown in Fig. 1 however, the plunger prevents the locking element from being moved radially outward until a groove 21 on the inner surface of plunger is moved down to a position where the locking element may be received within the groove. The power applying element 22 for moving whatever load is to be moved by the thruster surrounds the plunger 16. As shown in Fig. 2 the carrier 19 contains three substantially equidistantly spaced recesses 23 each of which is for one of the locking elements 18. When the plunger has been moved far enough for its recess 21 to be moved to a position for receiving the locking elements 18, then the shape of the firing pin on the right side of the locking elements in combination with the spring pressure causes the locking elements 18 to be moved radially outward, releasing the firing pin 14 to be moved under spring pressure into contact with the cartridge 13 for firing.

As shown in Figs. 1 and 3, a pressure responsive element 24 is slidable in advance of the power applying element 22 for the purpose of removing a positive lock from the tubes to be ejected. The lock includes a larger split ring 25 and a smaller inner split ring 26 shown in Figs. 1, 5 and 6. Around the outer or larger split ring 25 is a sealing band 27 of wire which must be broken in tension when the pressure responsive element 24 is moved to the right expanding the split rings into the recess 28 in the outer tube or cylinder 10.

As shown in Fig. 3, the slidable element 24 is provided with six fingers each of which has an outer flat end portion 30 and a tapered or inclined portion 31. The fingers of the element 24 are adapted to be received within the grooves 33 in the head's ribs 32 which are shown in Fig. 4 of the drawing. The circumferential groove 34 shown in Fig. 4 is for the purpose of receiving the split ring locking elements of Figs. 5 and 6. A left end 35 of the head shown in Fig. 4 constitutes an abutment or stop for the downturned flange 36 (Fig. 3) of the slidable element 24. The larger 25 of the split rings is for the purpose of performing the locking function between the intermediate and outer tubes 10 and 11. As shown in Fig. 6 the bend 37 in the smaller or inner split ring 26 is for the purpose of preventing misalignment of the rings 25 and 26 so as to keep any one of the fingers 29 of the slidable element 24 from entering between the ends of the larger split ring 25.

Referring again to Fig. 1, at its left end is shown a space 38 between the inner tube 12 and the end 39 of the thruster which is attached to the plane. The left end of the intermediate tube 11 is enlarged at 40 and provided with a plurality of holes through which, when the tube 11 has been moved slightly to the right, pressure will be admitted to the space between the outer and intermediate tubes for the purpose of providing a balance to prevent outward bulge of these inner and intermediate tubes. The application of the pressure to the left end 40 of the intermediate tube causes the tube to be moved slightly to the right, engaging the downturned flange 36 of the slidable element 24 and causing it to be moved to the right. This results in movement of the split rings 25 and 26 up the inclined portion 31 of the fingers 29, causing the sealing band to be broken and the rings 25 and 26 to be moved in the recess 28, disengaging ribs 32 on element 22, so that the intermediate tube may then be moved with the inner tube to the right for moving whatever load is to be thrust outwardly from the plane. When unlocked, the intermediate and inner tubes move to the right, together under the pressure of cartridge gas within the inner tube causing the load to be moved to the right. The inner tube continues its movement after the intermediate tube 11 is stopped by its abutment 43 reaching the stop 44 on the end portion which is secured to the outer tube 10. Upon stoppage of the intermediate tube, the inner tube continues moving under gas pressure until it has been completely ejected from the outer tube along with the movement of the load.

In operation, the application of fluid pressure into the passageway 17 causes the plunger 16 to be moved to the left, compressing the spring 15 and causing the groove 21 to become aligned with the locking element 18. The shape of the firing pin on the right side of the locking elements 18 together with the pressure of the spring 15 causes the locking elements to be moved radially outward into the groove 21 in the plunger 16 and thus allowing the firing pin 14 to be moved to the left under spring pressure for firing the cartridge 13. After firing the cartridge, the gas pressure within the inner tube 12 passes into the space 38 at the left end of the inner tube and around it to engage the left end of the intermediate tube causing this intermediate tube 11 to be moved slightly to the right in advance of any movement of the inner tube. The right end of the intermediate tube engages the downturned flange 36 on the slidable element 24 causing the split rings to be moved up the incline, rupturing the sealing band 27 and moving these split rings into the recess 28, disengaging ribs 32 on element 22, so that the intermediate tube and the inner tube may both be moved together under gas pressure to the right as the load is forced out of the plane. When the stop 43 on the intermediate tube reaches the wall 44, which is secured to the outer tube, further movement of the intermediate tube is stopped and only the inner tube then continues to move until it has been completely moved outside of the thruster. This invention is intended primarily for loads to be ejected from an airplane.

Among the advantages of the present invention may be mentioned the provision of a shock-resistant lock for the firing pin whereby the firing pin is held against movement although the spring actuating the firing pin is only slightly stressed. This slight stressing of the firing pin spring is so weak that in event any one of the three locking elements should be fractured, and the firing pin moved to the left, it would still not be given sufficient impetus for firing the cartridge 13. The split rings of Figs. 5 and 6 constitute a foolproof and positive lock for the telescopic tubes so that the intermediate and inner tubes may not be moved or ejected from the outer tube in advance of the inner tube having been preliminarily moved under gas pressure to rupture the sealing band 27 and move the split rings 25 and 26 into the recess 28 so that the intermediate and outer tubes may then be moved outwardly. A pin 45 prevents relative rotation disengaging the inner tube 12 from the element 22.

We claim:

In a thruster of the type having at least three telescoping tubes including an outermost tube, means at one end of said outermost tube by which the same may be secured to an aircraft, an extension secured to said outermost tube at an opposite end from said means, a head within said extension and being provided with a power applying outer end portion, an innermost tube, and at least one intermediate tube, the combination therewith of the improvement for retaining said head held within said outermost tube and being releasable therefrom only after the application of fluid pressure for such release, and said improvement being also for enhancing the foolproof character of such thruster and the retention of the head in an extension of said outermost tube, said improvement including the outer end of said head being provided with a recess through which fluid under pressure may be supplied for firing a cartridge within said thruster for actuating the same, a plunger in said head movable under fluid pressure supplied from said recess, a sleeve within said plunger, a firing pin within said sleeve, said innermost tube being provided with space for a cartridge adjacent an end of said sleeve for being fired by said firing pin, a spring within said sleeve and plunger for moving said firing pin against a cartridge, said sleeve being provided with a perforation in a side wall thereof, a locking ball in said sleeve perforation, said firing pin having a tapered recess for holding a portion of said locking ball and retaining said firing pin in a position with said spring partially stressed, said plunger being provided with a recess into which said locking ball is pushed by a wall of said firing pin tapered recess after fluid pressure has moved said plunger and further compressed said spring to release said firing pin for movement toward a cartridge held within said innermost tube for firing the same, said means including a closed end wall for said thruster outer tube, said innermost tube terminating short of said closed end wall to enable fluid pressure in said innermost tube from a cartridge passing around an end of said innermost tube and into contact with an end of said intermediate tube, a locking device for holding said head secured to said outermost tube within said extension for release in response to fluid pressure from said cartridge, said locking device including a pair of substantially concentric split rings having their split portions angularly displaced, said head being provided with spaced longitudinal channels, a portion of said head beneath said split rings being raised above a base of said spaced longitudinal channels, a pressure responsive wedging element slidable outside said head and innermost tube but within said outermost tube, and its extension, said element having longitudinally tapered fingers slidable in said spaced longitudinal channels, a frangible sealing band radially outside said split rings, an outer end portion of said intermediate tube being longitudinally movable into contact with said wedging element whereby on firing a cartridge fluid pressure may move said wedging element fingers in said channels, radially expand said split rings and rupture said sealing band, said outermost tube extension having a peripheral recess into which said split rings may be expanded by said wedging element to allow removal of said head with said innermost tube under fluid pressure from a cartridge, said wedging element being also removable by said intermediate tube after said split rings have been expanded into said peripheral recess, and a stop on said outermost tube extension for engagement by said intermediate tube to limit outward movement of said intermediate tube yet allow continued outward movement of said innermost tube under fluid pressure, whereby only fluid pressure may actuate a cartridge for said thruster and only fluid pressure from a cartridge may then release said head for removal from said outermost tube with said innermost tube.

References Cited in the file of this patent

UNITED STATES PATENTS

| | | |
|---|---|---|
| 34,493 | Havens | Feb. 25, 1862 |
| 1,514,743 | Taylor | Nov. 11, 1924 |
| 1,618,851 | Thunberg et al. | Feb. 22, 1927 |
| 1,771,949 | Blanchard | July 29, 1930 |
| 1,949,451 | Brulatour | Mar. 6, 1934 |
| 2,479,960 | Osborn | Aug. 23, 1949 |
| 2,489,984 | Shoemaker | Nov. 29, 1949 |
| 2,527,020 | Martin | Oct. 24, 1950 |

FOREIGN PATENTS

| | | |
|---|---|---|
| 761,457 | Great Britain | Nov. 14, 1956 |